United States Patent [19]

Kawamata et al.

[11] 4,093,173
[45] June 6, 1978

[54] MOLD FOR MANUFACTURE OF BODIES FOR TRANSPORTING UNITS

[76] Inventors: Tadahisa Kawamata, Rua Pirassununga, 484; Carlos Jorge Freire Antunes, Rua Bento de Matos, 133/33; Carlos de Brito Antunes, Rua Augusta, 2110/11, all of Sao Paulo, Brazil

[21] Appl. No.: 799,145

[22] Filed: May 23, 1977

Related U.S. Application Data

[62] Division of Ser. No. 642,237, Dec. 18, 1975, abandoned.

[30] Foreign Application Priority Data

Dec. 23, 1974 Brazil .................................. 010738

[51] Int. Cl.² .......................... B29C 5/00; B29C 1/14; B29F 1/00
[52] U.S. Cl. ........................................ 249/105; 249/27; 249/144; 249/148; 249/149; 249/160
[58] Field of Search ...................... 249/18, 13, 26, 27, 249/105, 142, 144, 160, 148, 149; 156/245; 220/9 F

[56] References Cited

U.S. PATENT DOCUMENTS

| | | | |
|---|---|---|---|
| 1,182,944 | 5/1916 | Urban | 249/144 X |
| 2,068,302 | 1/1937 | Nickol | 249/149 X |
| 2,544,297 | 3/1951 | Callan | 249/27 X |
| 2,717,436 | 9/1955 | Tourneau | 249/144 X |
| 2,897,608 | 8/1959 | Graham | 249/13 X |
| 3,132,382 | 5/1964 | Magester | 249/105 X |
| 3,424,425 | 1/1969 | Holtkamp | 249/144 |
| 3,687,597 | 8/1972 | Lavergne | 249/145 X |
| 3,739,936 | 6/1973 | Jones | 249/105 X |
| 3,802,975 | 4/1974 | Saidla | 156/245 X |
| 3,841,479 | 10/1974 | Szatkowski | 220/9 F X |
| 3,884,613 | 5/1975 | van der Lely | 249/27 X |

*Primary Examiner*—J. Howard Flint, Jr.
*Attorney, Agent, or Firm*—Christie, Parker & Hale

[57] ABSTRACT

Monocoque bodies for transport units are manufactured by joining together two separate parts, a main structure consisting of the bottom and side walls as the first part and the roof as the second part. Each part is produced from a plastic material by using a single two part mold.

10 Claims, 12 Drawing Figures

U.S. Patent June 6, 1978 Sheet 1 of 4 4,093,173
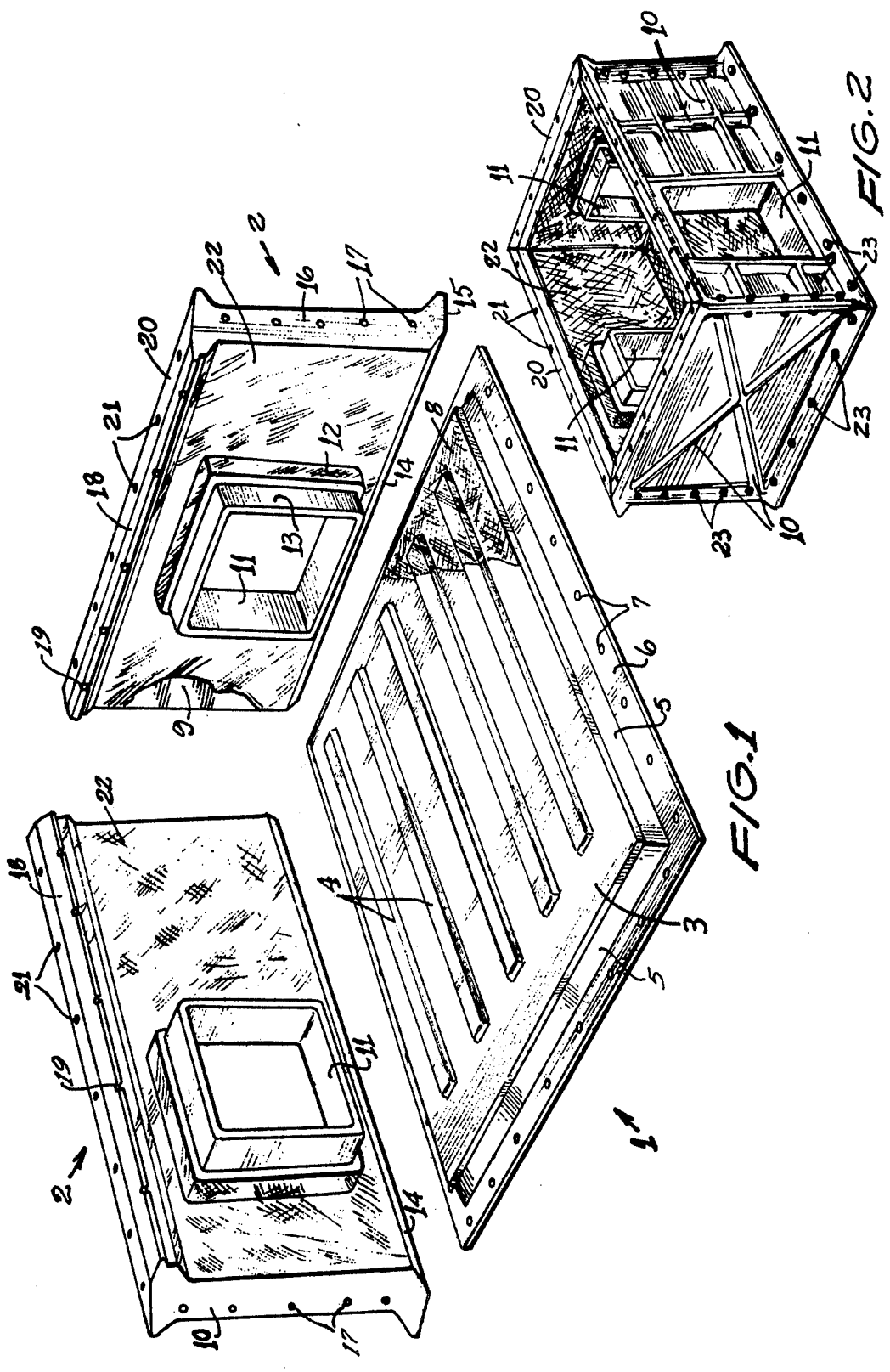

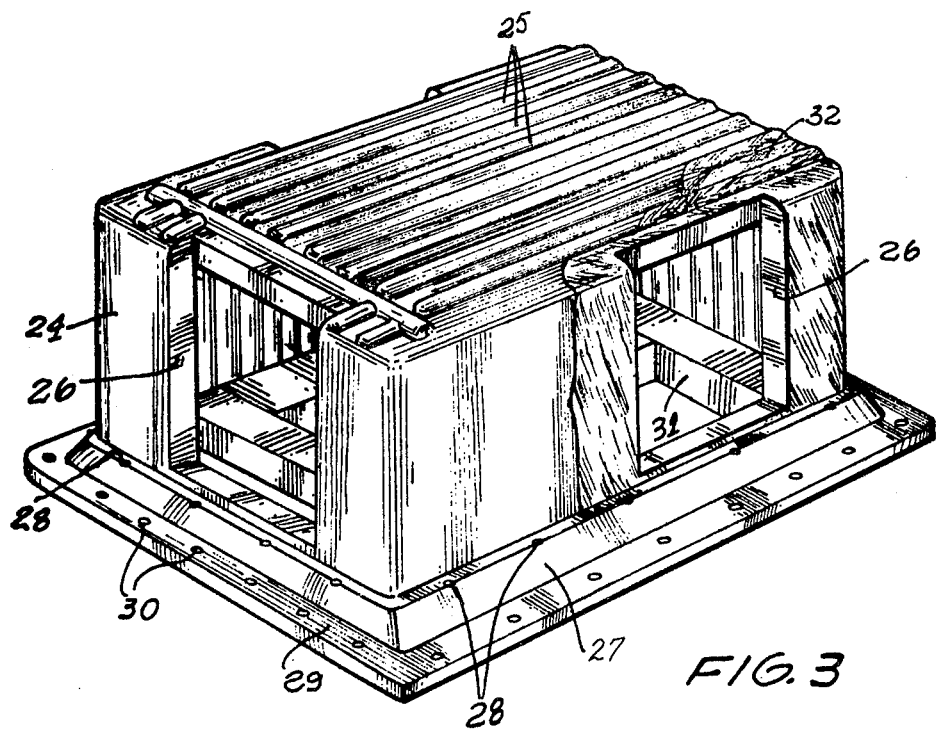
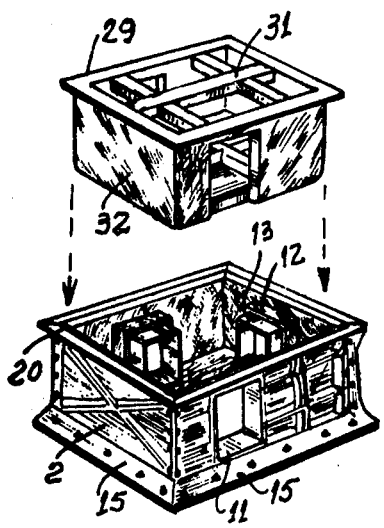
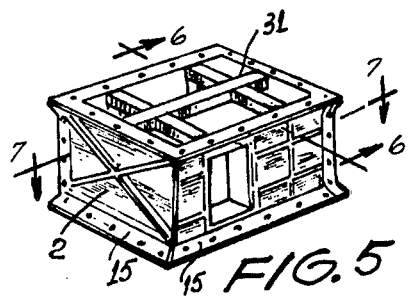
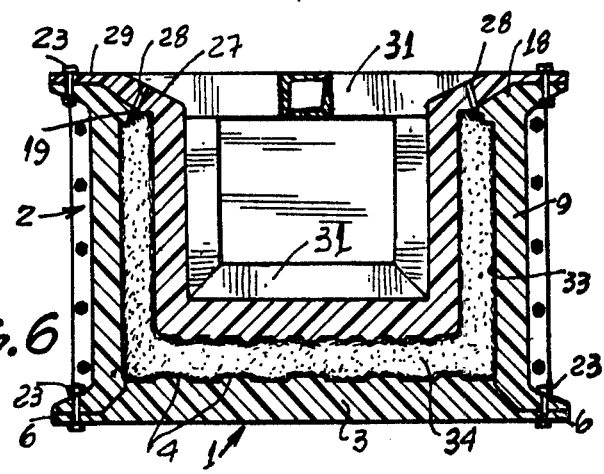

MOLD FOR MANUFACTURE OF BODIES FOR TRANSPORTING UNITS

CROSS REFERENCE TO RELATED APPLICATIONS

This is a division of application Ser. No. 642,237, filed Dec. 18, 1975, now abandoned.

BACKGROUND OF THE INVENTION

Bodies for isothermal transporting units such as refrigerated or heated trucks, pick-ups, trailers, railway cars, and the like are made of a synthetic material. The bodies, although they appear to be made in a monocoque construction, actually are obtained by the union of separate panels. The panels are mounted around a support structure and are interconnected and closed through special fastening devices.

In spite of the wide utilization of this type of body, this type suffers from many disadvantages. These include the complexity and expense of their manufacture because of waste of material, equipment and labor in the fabrication of many separate panels and a separate support structure for the panels, and assembly of the panels and support structure. All these steps adversely affect the manufacture of this type of body and thereby limit their popularity.

Another disadvantage of this type of body is its poor operating performance and durability. Because the separate panels which compose the body must be joined together, usually not in a rigid and permanent manner, cracks and rifts tend to appear due to travelling, for example on rough roads and streets, and similar tracks. These cracks jeopardize the performance of the vehicle body and therefore this type of body requires constant and costly repair and maintenance which further serves to limit the popularity of this type of body.

SUMMARY OF THE INVENTION

Therefore, in view of the disadvantages of existing types of bodies for isothermal transporting units, and aiming at correcting the same, I have made improvements in the manufacture of bodies for transporting units of the above mentioned type. This improvement, which introduces a totally new and revolutionary manner of manufacture, no longer uses separate panels as in the traditional type of bodies, but uses an actual, complete, and practically monocoque construction. Bodies are made by this method in a much more simple, ingenious and rational manner.

My improved method comprises making the body proper in two separate parts, a main structure which comprises the bottom and side walls in a single part, and a structure which comprises the roof or cover. Each part is manufactured by using a single pair of molds, and then the parts are joined together in a rigid and permanent manner, forming a true monocoque structure. Each pair of molds comprises an external mold and an internal mold for casting the main structure and cover from a plastic material. The main structure and cover are made in separate parts of monocoque construction. These two parts always, fit each other by juxtaposition of peripheral plane rims, the fitting or securing of the parts being effected by means of bolts passing through spaced apart holes.

In the molding of the parts, the inside face of the external mold and the outside face of the internal mold receive a surface anti-adherence treatment such as a mold release agent. Then a lining layer of a plastic composition based on fiberglass and synthetic resins is applied. The molds are then closed and then the intermediary chambers between the external and internal molds are filled with a filling material based on rigid polyurethane foams and fiberglass which firmly adheres to the inner layers of linings. The lining layers form the external surfaces of the molded main structure and cover.

DRAWINGS

The appended drawings illustrate the present invention, wherein:

FIG. 1 shows a perspective view of the separate and component parts of an external mold for manufacture of the main structure of a body manufactured according to a method embodying features of this invention;

FIG. 2, also in a perspective view, illustrates the external mold of FIG. 1 assembled;

FIG. 3, also in perspective view, shows the internal complementary mold for the mold of FIG. 1;

FIGS. 4 and 5 illustrate, in subsequent stages, the the assembly operation of the external and internal molds of FIGS. 2 and 3 to compose a single set of molds;

FIG. 6 and 7 are cross and longitudinal views, respectively, along lines 6—6 and 7—7 in FIG. 5, the set being in position for molding a body structure;

DETAILED DESCRIPTION OF THE INVENTION

Figure 8:
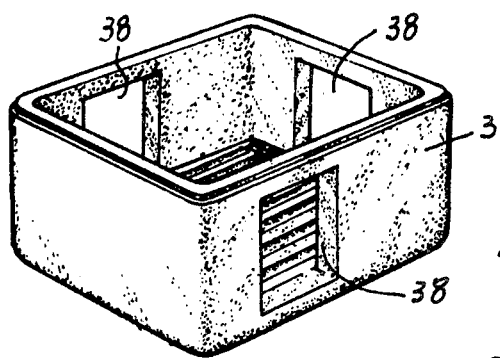
FIG. 8 is a perspective view of the body structure, extracted from the corresponding molds of FIGS. 6 and 7.
Figure 12:
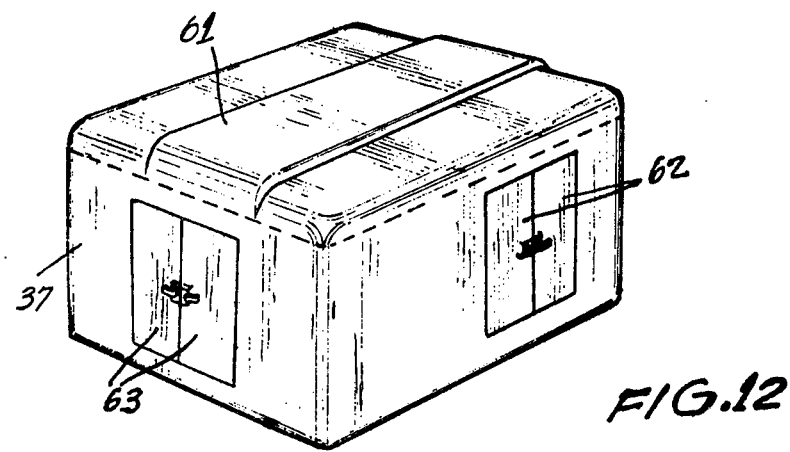
FIG. 12 is a view of the body entirely completed, and manufactured according to the technique and using the molds of the present invention.

As illustrated by the above Figures, an improved method for the manufacture of bodies for transport units comprises manufacturing the body proper in two separate parts. These two parts are the main body which comprises the bottom and the side walls in a single and monocoque part, as shown in FIG. 8, and the roof or cover therefor. Each part is manufactured by using a single pair of molds wherein the size and shape of the molds vary according to the intended size and configuration characteristics of the part. The two parts, after they are molded, are joined together in a rigid and definitive manner, thereby forming a single monocoque structure as shown in FIG. 12.

With respect to the body's main structure, the pair of molds for manufacture thereof comprises an external female mold, shown in FIGS. 1 and 2, formed in separate panels, such as bottom panel 1 and side panels 2. These panels are made of plastic material.

The bottom panel 1 consists of a plate 3 having a rectangular or other desired shape. The internal face of the plate 3 is provided with ribs 4 or any other relief corresponding to the eventual desired external configuration of the body bottom. The external face of the plate 3 is also provided with ribs (not shown), which act as a reinforcement. Along the edge of the plate 3 is a circumferential flat ribbon 5 inclined at an angle of 45 degrees to the plate 3. This ribbon merges into a peripheral flange 6 provided with evenly spaced apart holes 7 for fasteners such as bolts for securing the bottom panel 1 to the side panels 2.

Before assembling the bottom 1 and side panels 2 of the external mold for the body's main structure, the external surface of the bottom panel 1 receives a coating of a release agent which is followed by lining with a layer 8 of a plastic composition of fiberglass and synthetic resins. This layer 8 is spread only over the surface of the plate 3. The inclined circumferential ribbon 5 and the peripheral flange 6 remain free of the plastic composition.

The side panels 2 are formed by a rectangular or equivalent plate 9 having external reinforcement ribs 10. In the positions corresponding to those intended for the body's side doors there is a rectangular opening in the plate 9 surrounded in the plate's inner face by externally stepped frames having two steps, an outer step 12 and an inner step 13. The outer step 12 has a thickness corresponding to that intended for the body's walls.

The lower edge 14 of the plate 9 is chamfered in an inclined plate of 45° and is followed by a flat horizontal peripheral flange 15, having equally spaced apart bolt holes for fitting purposes. The vertical side edges 16 of the plate 9 are also chamfered in inclined planes identical to the inclined plane of the plate's lower edge 14. The side edges 16 also have spaced apart bolt holes 17 for fitting the side panels to each other.

The upper edge of the side panel plate 9 forms a double rim, with an inner rim 18 being inclined, and a lower stepped section which is provided with small spaced apart orifices 19 for injection of molding materials. An external flat horizontal rim 20 of the upper edge of the plate 9 has bolt holes 21 spaced apart for fitting inner and outer molds together.

Just as the bottom panel 1 is treated, likewise each side panel 2 receives a surface treatment of a release agent on its inner side, followed by lining with a layer 22 of a composition based on fiberglass and synthetic resins. The lining layer is spread over the entire area of the plate 9, including the lower and stepped part of the upper edge inner rim 18, as well as the inner step 13 contouring the door opening 11.

The bottom panel 1 and side panels 2 are assembled to constitute, as mentioned above, the external mold for manufacture of the body's main structure. The side panels 2 are assembled orthogonally to the bottom panel 1, with a perfect fitting of the lower chamfered edges 14 as well as the flat horizontal peripheral flanges 15 of the side panels 2 over the inclined circumferential ribbon 5 and peripheral flange 6 of the bottom panel 1. The fitting and securing of the plate is effected with bolts 23 placed through aligned bolt holes as shown in FIG. 2. Each side panel 2 is bolted by bolts 23 through aligned bolt holes 17 to the adjacent side panels with the side panels being equally orthogonal to each other and with juxtaposition of the chamfered side edges 16, as shown in FIG. 2.

As shown in FIG. 3, an internal male mold, like the external female mold, is made in a single part of plastic material and is formed from a substantially prismatic rectangular box 24, having an open top. The lower external face of the box 24 is provided with ribs 25 or another projection corresponding to that intended for the internal face of the body bottom. The sides of the box 24 are provided with rectangular openings 26 corresponding exactly with the openings 11 for doors of the external mold. The openings 26 extend to and through the bottom of the box.

The free edge of the box 24 at the top of the box is surrounded by an inclined circumferential flat ribbon 27 having spaced apart orifices 28 for injection of molding material. The ribbon 27 is followed by a flat horizontal peripheral rim 29 having spaced apart bolt holes 30 for fitting purposes. The internal mold is also equipped with an inner frame 31 formed by iron angle plates for reinforcement and lifting. Like the external mold, the internal mold receives externally a release agent treatment followed by lining with a layer 32 of a composition based on fiberglass and synthetic resins. The layer 22 is spread along the entire area of the bottom and side faces. However, the circumferential ribbon edge 27, the peripheral rim 29, and the walls of openings 26 remain free of the lining layer 32.

In order to manufacture the body's main structure, the inner mold, suitably lifted by the frame 31, is introduced inside the external mold, as shown in FIG. 4. The inner mold is suspended by direct contact of its peripheral rim 29 over the corresponding external horizontal rim 20 of the outer mold's side panels 2. The molds are secured together with bolts 23 through the aligned bolt holes 30 and 21, as shown in FIG. 5.

Figure 7:
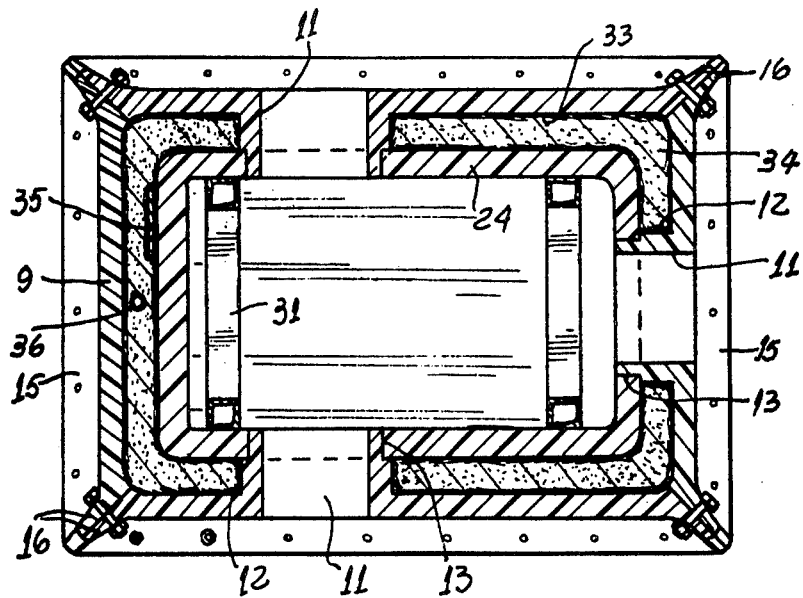

By assembling the inner and outer molds a chamber 33, as shown in FIGS. 6 and 7, is formed. The width of the chamber 33 corresponds to the thickness intended for the walls of the body to be molded. The chamber 33 is is then filled with a filling material 34 based on rigid polyurethane foams and fiberglass, introduced through the aligned injection orifice 28 and 19 of the internal mold and side panels of the external mold, respectively.

During the solidification period, the inner lining layers of the bottom 8 and side panels 22 of the external mold, as well as the external lining 32 of the internal mold, are free from adherence with the surfaces whereon they have been applied due to the suitable release agent treatment to which they have been previously submitted. These layers firmly adhere to the filling material 34, thereby making up the external lining of the filling material and consequently the walls of the then molded body.

As shown in FIG. 7, before the filling material is injected into the main structure's mold, a plurality of support plates 35 made of wood, metal or other suitable material, as well as conduits 36, can be positioned in chamber 33. These support plates 35 and conduits 36 are placed in previously established positions corresponding to the body's design and corresponding to the positions intended for installation of apparatuses such as wiring conduits, signaling lights, inner supports and the like. This method results in support plates 35 and 36 being imbedded inside the molded body walls.

Upon complete solidification of the material injected inside the mold, opening of the mold is performed by first removing the bolts 23 which secure the internal mold to the external mold, followed by lifting and disconnection of the internal mold. The opening of the mold is completed by removal of the bolts 23 which connect the panels composing the external mold, thereby resulting in a main structure 37 of the body, as shown in FIG. 8.

This main structure 37 of the body comprises the bottom and side panels in a single part, with appropriate openings 38 for installation of the doors.

Figure 9:
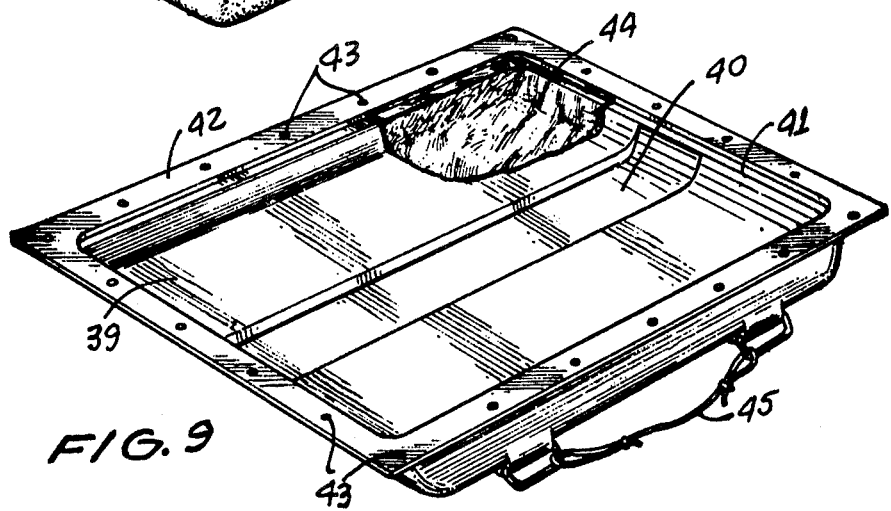
FIGS. 9 and 10 are perspective views, with partial section views, of external and internal molds, respectively, for manufacture of the body roof or cover.

The roof or cover of the body is manufactured in the same manner as the main structure. The pair of molds for obtaining the roof comprises an external female mold, as shown in FIG. 9. The external mold is made in one single part of plastic material, and comprises a bottom plate 39, which has an internal face provided with a relief such as projections 40 corresponding to the relief intended for the roof's external surface. The bottom plate 39 extends to side panels 41 which have a slightly bent frame, the frame forming a small stepped edge followed by a flat horizontal peripheral rim 42, having spaced apart holes for fasteners such as bolts 43 for fitting purposes. The internal face of the external mold receives a suface treatment of a release agent for anti-adherence, followed by application of an inner layer 44 of a plastic composition based on fiberglass and synthetic resins, which is spread over the entire area of the bottom plate 39 and side panels 41. The external mold is equipped externally with side handles 45 for ease of handling.

Figure 10:
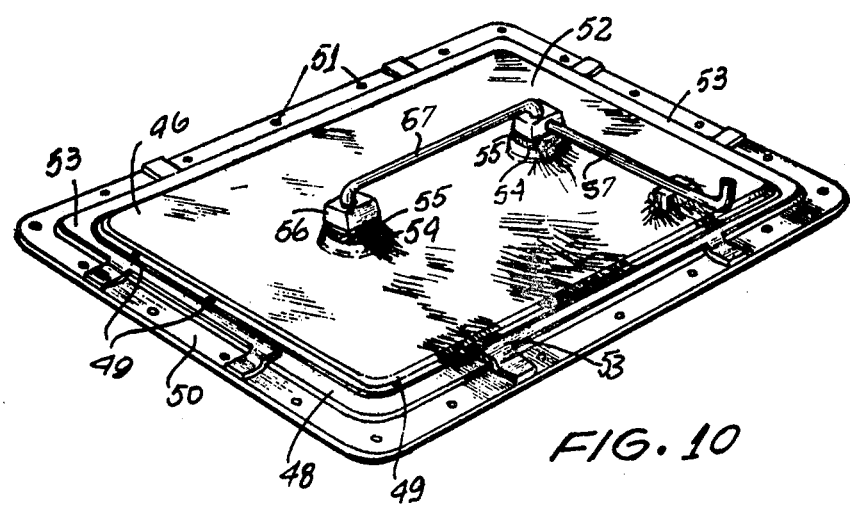

The internal male mold for the roof, as shown in FIG. 10, is complementary to the external mold. The internal mold has handles on its external face. It comprises likewise a rectangular plate 46 having reinforcement ribs 47 and stepped edges 48. There are spaced apart orifices 49 for injection of molding material on the stepped edges. The stepped edges 48 are followed by a horizontal flat peripheral rim 50, having spaced apart bolt holes 51 for fitting purposes. The rectangular plate 46 receives on its internal face a surface release agent treatment, followed by the application of a layer 52 of a plastic composition based on fiberglass and synthetic resins which is spread over an area framed by a removable frame 53. The frame 53 is placed immediately inward from the injection orifices 49.

The internal mold may also have one or more internal projections 54, which fix the positions for small plates 55 to support light boxes 56. The light boxes 56 are interconnected by straight pipes 57 which serve as electric wire conduits.

Figure 11:
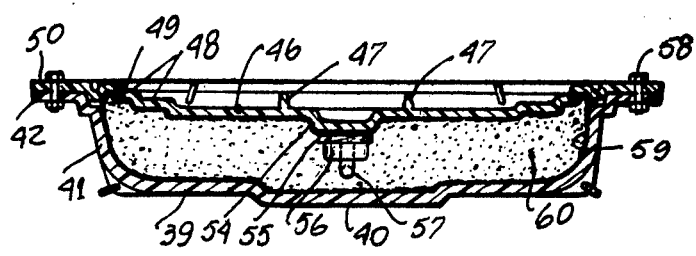
FIG. 11 is a cross sectional view of the molds of FIGS. 9 and 10 suitably mounted, the molds being in position for the body roof or cover.

In order to mold the body's roof or cover, the internal mold is applied over the external mold with direct juxtaposition of the peripheral rims 50 of the internal molds and peripheral rims 42 of the external molds. The molds are secured to each other by means of bolts 58 passing through the then aligned bolt holes 51 and 43, as shown in FIG. 11. A chamber 59 is thereby formed between the molds which is then filled with the filling materials 60 based on rigid polyurethane foams and fiberglass. The filling material is introduced through the injection orifices 49 of the internal mold, the filling material fully enveloping the entire set of light boxes 56, conduits 57, and other structures provided inside the mold.

During the solidification period, the inner lining 44 of the external mold, as well as the external lining 52 of the internal mold, are free from adherence with the surfaces on which they have been applied, just as in the molding of the body's main structure. The lining layers firmly adhere to the filling material 60, and thereby constitute the external lining of the filling material and consequently the external walls of the roof or cover. After complete solidification of the injected material inside the mold, the mold is opened very simply by removing the bolts 58 and by lifting the internal mold away from the molded roof or cover, which may then be removed from the mold. The previously positioned set of light boxes and conduits are embedded in the roof with only the free ends of the conduits appearing in the roof's inner surface.

Once the main body 37 and the roof or cover 61 are obtained, the body's final assembly is made, as shown in FIG. 12, by placing the roof over the body with a perfect juxtaposition of the free edges. The roof is attached to the body by means of an adhesive which is also based on fiberglass and synthetic resins, thereby obtaining a firm, rigid and perfectly finished connection of the roof to the body, without any traces of the former separation of the two parts.

It is also noted that like the procedure employed for the main structure and the roof, the doors 62 of the body are also obtained by means of a pair of plastic molds (not shown) in the respective configurations and having the internal projections corresponding to the external relief intended for the doors. The molds are closed by juxtaposition of plane peripheral rims, with the rims secured together by spaced apart bolts after application of release agent onto the faces that are turned to the inner side and application of a layer of a plastic composition based on fiberglass and synthetic resins. Filling material based on rigid urethane foams and fiberglass is injected through the appropriate orifices and the lining layers adhere to the filling material, thereby forming the door's external faces. Before injection of the filling material, supports for installation of complementary locking devices, hinges and other structures may be provided inside the molds so that they will be embedded in the door's body.

Although this invention has been described in considerable detail with reference to certain embodiments thereof, it will be understood that variations and modifications can be effected within the spirit and scope of the invention as described above and defined in the appended claims.

I claim:

1. Apparatus for the manufacture of a body having a bottom, at least four side walls, at least one door, and a roof for isothermal transport units, such as refrigerated or heated trucks, trailers, railway cars and the like, comprising a single pair of molds consisting of an internal mold and an external mold for molding a main structure comprising the bottom, the side walls, and at least one door opening of the body in a single monocoque part, the main structure external mold comprising:

a bottom panel;

side wall panels;

plates for the bottom and the side wall panels having an internal face with relief corresponding to the desired external configuration of the body, and external faces having reinforcing ribs;

means for securing the bottom panel plates to each of the side wall panel plates;

a double rim on the upper edge of the side panel plates comprising (i) an inner rim having an upper section inclined to the plate and a lower stepped section and (ii) an external flat horizontal rim;

orifices through the lower stepped section of the inner rim of the double rim of the side panel plates for injection of molding material;

spaced apart bolt holes through the extended horizontal rim of the double rim of the side panel plates for securing the external mold to the internal mold; and at least one rectangular door opening through the side panel plates having a size, configuration and location desired for a door of the body;

the main structure internal mold comprising
a substantially prismatic box having an open top for the internal mold, wherein the box comprises:
an outer surface with relief corresponding to the desired internal configuration of the body;
sides having rectangular openings extending to and through the bottom of the box, the openings corresponding to openings in the side panels of the external mold;
an inclined flat circumferential ribbon around the top of the box;
spaced apart orifices through the circumferential ribbon for injection of molding materials located so the injection orifices of the main body external mold and the main body internal mold are aligned when the main body external and internal molds are assembled;
a horizontal peripheral rim extending from the circumferential ribbon for suspending the internal mold on the extended horizontal rim of the double rim of the external mold; and
spaced apart holes through the horizontal peripheral rim for securing the internal mold to the external rim of the side panel of the external mold so that the walls and bottom of the prismatic box are suspended away from the bottom and side panels of the main body external mold when the main body external and internal molds are assembled.

2. The apparatus of claim 1 comprising in addition a single pair of molds consisting of an internal mold and an external mold for the roof, the roof external mold comprising:
a bottom plate having an inner face provided with a relief corresponding to the relief intended for the roof's external surface;
smoothly curved sides extending from the bottom plate;
a flat horizontal rim projecting from the sides;
spaced apart fastening holes through the rim; and
handle means for lifting the roof external mold;
the internal mold for the roof corresponding to the external mold for the roof and comprising:
a plate with a stepped edge;
reinforcement ribs on the external face of the plate;
handle means on the external face of the plate; and
spaced apart fastening holes through the stepped edge for securing the roof internal mold to the rim of the roof external mold.

3. Apparatus as claimed in claim 1 wherein there is at least one projection on the external surface of the main body internal mold and the internal surface of the main body external mold for forming installation apparatus and electrical conduits for the main body.

4. Apparatus as claimed in claim 2 in which there is at least one internal projection on the roof internal mold for forming installation apparatus for the roof of the body.

5. Apparatus as claimed in claim 1 comprising in addition molds for manufacturing the doors comprising an internal and external mold corresponding to the desired shape and configuration of the door, wherein the door internal mold and door external mold have injection orifices which align and peripheral rims which juxtapose when the molds are assembled together, the peripheral rims having bolt holes for securing the door internal and door external molds together, and the mold surfaces having a relief corresponding to the door structures for installation of locks, hinges, and the like.

6. Apparatus for the manufacture of a body having a bottom, at least four side walls, at least one door, and a roof for isothermal transport units, such as refrigerated or heated trucks, trailers, railway cars and the like, comprising
a single pair of reusable molds consisting of an internal mold and an external mold for molding a main structure comprising the bottom, the side walls, and at least one door opening of the body in a single monocoque part, the main structure external mold comprising:
a bottom panel;
side wall panels;
plates for the bottom and the side wall panels having an internal face with relief corresponding to the desired external configuration of the body;
means for securing the bottom panel plates to each of the side wall panel plates;
orifices for injection of molding material;
means for securing the external mold to the internal mold; and
at least one door opening through the side panel plates having a size, configuration and location desired for a door of the body;
the main structure internal mold comprising
a substantially prismatic box having an open top, wherein the box comprises:
an outer surface with relief corresponding to the desired internal configuration of the body;
sides having openings extending to and through the bottom of the box, the openings corresponding to openings in the side panels of the external mold;
orifices for injection of molding materials located so the injection orifices of the main body external mold and the main body internal mold are aligned when the main body external and internal molds are assembled; and
means for securing the internal mold to the external mold so that the walls and bottom of the prismatic box are suspended away from the bottom and side panels of the main body external mold when the main body external and internal molds are assembled.

7. The apparatus of claim 6 comprising in addition a single pair of reusable molds consisting of an internal mold and an external mold for the roof, the roof external mold comprising:
a bottom plate having an inner face provided with a relief corresponding to the relief intended for the roof's external surface;
sides extending from the bottom plate;
a flat horizontal rim projecting from the sides;
spaced apart fastening holes through the rim; and
handle means for lifting the roof external mold;
the internal mold for the roof corresponding to the external mold for the roof and comprising:
a plate with a stepped edge;
handle means on the external face of the plate; and
spaced apart fastening holes through the stepped edge for securing the roof internal mold to the rim of the roof external mold.

8. Apparatus as claimed in claim 6 wherein there is at least one projection on the external surface of the main body internal mold and the internal surface of the main body external mold for forming installation apparatus and electrical conduits for the main body.

9. Apparatus as claimed in claim 7 in which there is at least one internal projection on the roof internal mold for forming installation apparatus for the roof of the body.

10. Apparatus as claimed in claim 6 comprising in addition reusable molds for manufacturing the doors comprising an internal and external mold corresponding to the desired shape and configuration of the door, wherein the door internal mold and door external mold have injection orifices which align and peripheral rims which juxtapose when the molds are assembled together, the peripheral rims having bolt holes for securing the door internal and door external molds together, and the mold surfaces having a relief corresponding to the door structures for installation of locks, hinges, and the like.

* * * * *